(12) United States Patent
Uemura et al.

(10) Patent No.: US 11,130,178 B2
(45) Date of Patent: Sep. 28, 2021

(54) COMPOSITE PROCESSING MACHINE, MACHINING TOOL, AND COMPOSITE PROCESSING METHOD

(71) Applicant: Yamazaki Mazak Corporation, Niwa-gun (JP)

(72) Inventors: Kazuki Uemura, Niwa-gun (JP); Naokazu Okabe, Niwa-gun (JP); Eiji Matsubara, Niwa-gun (JP); Shoya Kai, Niwa-gun (JP)

(73) Assignee: YAMAZAKI MAZAK CORPORATION, Aichi (JP)

(*) Notice: Subject to any disclaimer, the term of this patent is extended or adjusted under 35 U.S.C. 154(b) by 83 days.

(21) Appl. No.: 16/040,540

(22) Filed: Jul. 20, 2018

(65) Prior Publication Data

US 2018/0326494 A1 Nov. 15, 2018

Related U.S. Application Data

(63) Continuation of application No. PCT/JP2016/082884, filed on Nov. 4, 2016.

(51) Int. Cl.
*B22F 12/00* (2021.01)
*B33Y 30/00* (2015.01)
(Continued)

(52) U.S. Cl.
CPC .............. *B22F 12/00* (2021.01); *B22F 3/162* (2013.01); *B22F 3/24* (2013.01); *B22F 10/20* (2021.01); *B22F 12/82* (2021.01); *B23P 23/04* (2013.01); *B23Q 11/0891* (2013.01); *B33Y 10/00* (2014.12); *B33Y 30/00* (2014.12);
(Continued)

(58) Field of Classification Search
None
See application file for complete search history.

(56) References Cited

U.S. PATENT DOCUMENTS

| 2008/0017620 A1* | 1/2008 | Sukhman ............. B23K 26/127 |
| | | 219/121.86 |
| 2008/0158502 A1* | 7/2008 | Becker .................... A61F 9/067 |
| | | 351/44 |

(Continued)

FOREIGN PATENT DOCUMENTS

| CN | 202894600 | 4/2013 |
| CN | 203493810 | 3/2014 |

(Continued)

OTHER PUBLICATIONS

Espacenet machine translation of CN-203493810-U retrieved on Dec. 14, 2019 (Year: 2013).*

(Continued)

*Primary Examiner* — Keith D. Hendricks
*Assistant Examiner* — Joshua S Carpenter
(74) *Attorney, Agent, or Firm* — Mori & Ward, LLP

(57) ABSTRACT

A machining tool includes a light irradiator, a cover, and a light blocking filter. The light irradiator is to irradiate a workpiece to process the workpiece. The cover covers the light irradiator and the workpiece in the cover. The light blocking filter is configured to change light transmissivity of the light blocking filter in accordance with light from an inside of the cover, which the light blocking filter receives.

17 Claims, 15 Drawing Sheets

(51) Int. Cl.

| | |
|---|---|
| *B33Y 40/00* | (2020.01) |
| *B22F 12/82* | (2021.01) |
| *B33Y 50/02* | (2015.01) |
| *B22F 3/24* | (2006.01) |
| *B23P 23/04* | (2006.01) |
| *B23Q 11/08* | (2006.01) |
| *B22F 3/16* | (2006.01) |
| *B22F 10/20* | (2021.01) |
| *B33Y 10/00* | (2015.01) |

(52) U.S. Cl.
CPC ............... *B33Y 40/00* (2014.12); *B33Y 50/02* (2014.12); *B22F 2003/247* (2013.01); *Y02P 10/25* (2015.11)

(56) References Cited

U.S. PATENT DOCUMENTS

| | | | | |
|---|---|---|---|---|
| 2008/0168860 | A1* | 7/2008 | Nishi | B23Q 11/0891 74/616 |
| 2014/0013479 | A1* | 1/2014 | Magnusson | A61F 9/067 2/8.7 |
| 2014/0168546 | A1* | 6/2014 | Magnusson | B23K 9/322 349/14 |
| 2015/0000108 | A1 | 1/2015 | Hasooet et al. | |
| 2015/0298211 | A1* | 10/2015 | Abe | B22F 3/1055 419/28 |
| 2017/0252847 | A1* | 9/2017 | Daniel | B23K 9/0956 |
| 2017/0259339 | A1* | 9/2017 | Riva | B33Y 10/00 |
| 2018/0093325 | A1 | 4/2018 | Mori et al. | |

FOREIGN PATENT DOCUMENTS

| | | | |
|---|---|---|---|
| CN | 203493810 U | * | 3/2014 |
| CN | 204379541 | | 6/2015 |
| CN | 105414981 A | * | 3/2016 |
| CN | 205363022 | | 7/2016 |
| CN | 205437458 | | 8/2016 |
| CN | 105945578 | | 9/2016 |
| EP | 2875799 | | 5/2015 |
| EP | 2902137 | | 8/2015 |
| EP | 3023228 | | 5/2016 |
| JP | 1-180219 U | | 12/1989 |
| JP | 4-12389 U | | 1/1992 |
| JP | 4-39576 U | | 4/1992 |
| JP | 2008-043973 | | 2/2008 |
| JP | 2014-113609 | | 6/2014 |
| JP | 2015-511180 | | 4/2015 |
| WO | 2016/152477 | | 9/2016 |

OTHER PUBLICATIONS

Espacenet machine translation of CN-105414981 retrieved on Dec. 14, 2019 (Year: 2015).*
Fluegel et al. Arc Welding Safety. University of Arizona. (1989) (Year: 1989).*
Japanese Office Action for corresponding JP Application No. 2017-504830, dated Feb. 21, 2017 (w/ English machine translation).
International Search Report for corresponding International Application No. PCT/JP2016/082884, dated Jan. 24, 2017.
Written Opinion for corresponding International Application No. PCT/JP2016/082884, dated Jan. 24, 2017.
Chinese Office Action for corresponding CN Application No. 201680079490.6, dated Dec. 29, 2018.
Chinese Office Action for corresponding CN Application No. 201680079490.6, dated Jul. 3, 2019.
Extended European Search Report for corresponding EP Application No. 16910789.3-1103, dated Nov. 13, 2018.

* cited by examiner

COMPOSITE PROCESSING MACHINE, MACHINING TOOL, AND COMPOSITE PROCESSING METHOD

CROSS-REFERENCE TO RELATED APPLICATIONS

The present application is a continuation application of International Application No. PCT/JP2016/082884, filed Nov. 4, 2016. The contents of this application are incorporated herein by reference in their entirety.

BACKGROUND OF THE INVENTION

Field of the Invention

The present invention relates to a composite processing machine, a machining tool, and a composite processing method.

Discussion of the Background

A composite processing technology in which three-dimensional layer stacking modeling is performed on a metal workpiece by welding etc. (hereinafter, referred to as "additive manufacturing") and then a finish processing such as machining is performed on the additive-manufacturing formed thing is conventionally known.

Here, a processing machine for welding a workpiece using arc discharge or a laser beam includes a shading wall that covers the machine to protect an operator from light emitted from a light-irradiation unit when welding is performed. Further, the processing machine has an opening through which a workpiece is loaded and unloaded, on a part of the shading wall. The processing machine whose opening can be shut with a shield plate is known. (Ref. Japanese Unexamined Patent Application Publication No. 2008-43973, for example)

SUMMARY

According to a first aspect of the present invention, a composite processing machine includes a light irradiator, a cutting machine, a cover, and a shading filter. The light irradiator is to irradiate a workpiece with energy to perform additive manufacturing in a processing area. The cutting machine is to cut the workpiece in the processing area. The cover covers the processing area. The shading filter disposed on at least one face of the cover and configured to change a degree of shade in accordance with light received from the processing area.

According to a second aspect of the present invention, a composite processing method with a composite processing machine is disclosed. The composite processing machine includes an additive manufacturing unit configured to irradiate a workpiece with energy to perform additive manufacturing in a processing area, a machining unit configured to perform machining on the workpiece in the processing area, a cover unit configured to cover the processing area, a shading filter configured to change a degree of shade in accordance with light received from the processing area, and a protective plate configured to separate the shading filter from the processing area. The cover unit includes a first door unit and a second door unit that are disposed openably and closably on at least one face of the cover unit, a first sensor configured to detect opening and closing of the first door unit, and a second sensor configured to detect opening and closing of the second door unit. The first door unit includes the shading filter on a part of the first door unit. The second door unit includes the protective plate on a part of the second door unit. The composite processing method includes performing the additive manufacturing on the workpiece while a closed state of the first door unit and a closed state of the second door unit are both detected, and performing the machining on the workpiece while a closed state of the second door unit is detected.

According to a third aspect of the present invention, a machining tool includes a light irradiator, a cover, and a light blocking filter. The light irradiator is to irradiate a workpiece to process the workpiece. The cover covers the light irradiator and the workpiece in the cover. The light blocking filter is configured to change light transmissivity of the light blocking filter in accordance with light from an inside of the cover, which the light blocking filter receives.

According to a fourth aspect of the present invention, a composite processing method with a composite processing machine, includes detecting opening and closing of a first door of a cover by a first sensor, the cover covering a light irradiator and a workpiece in the cover, a light blocking filter being provided on the first door, detecting opening and closing of a second door of the cover by a second sensor, a protective plate being provided on the second door, irradiating the workpiece to perform additive manufacturing on the workpiece by a light irradiator provided on the first door while the first door and the second door are detected to be closed and the protective plate separates the light blocking filter from an inside of the cover, and perform cutting on the workpiece by a cutting machine when the second door is detected to be open. Light transmissivity of the light blocking filter is changed in accordance with light from the inside of the cover, which the light blocking filter receives.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
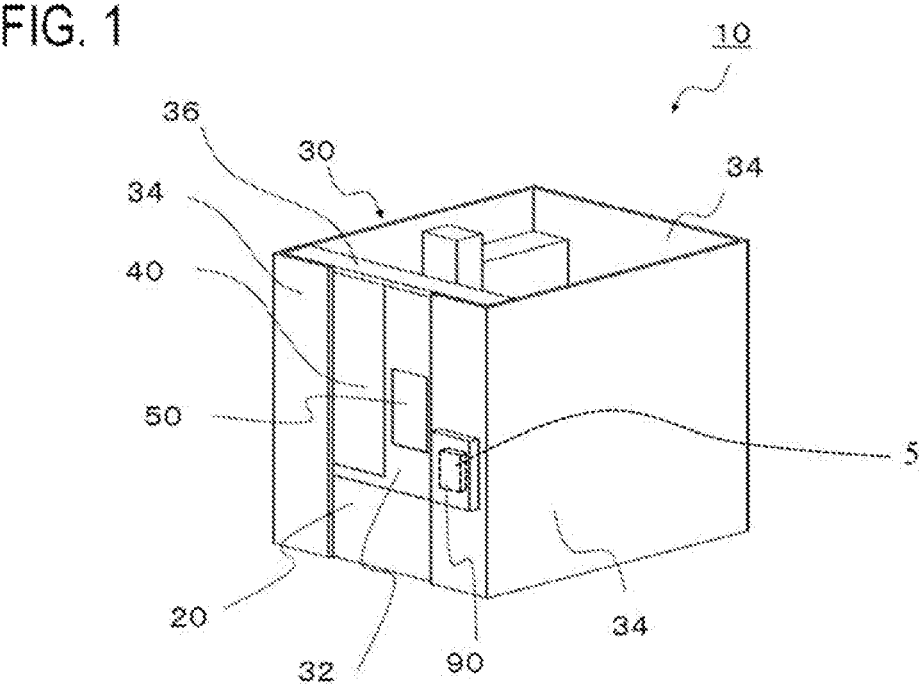
FIG. 1 is a perspective view of a composite processing machine according to a first embodiment of the present invention, illustrating an appearance of the whole composite processing machine.

The embodiment(s) will now be described with reference to the accompanying drawings, wherein like reference numerals designate corresponding or identical elements throughout the various drawings.

First Embodiment

A composite processing machine 10 according to a first embodiment of the present invention will be described with reference to FIGS. 1, 2, 3A, 3B, 3C, 3D, 4, 5A, 5B, and 5C.

Figure 2:
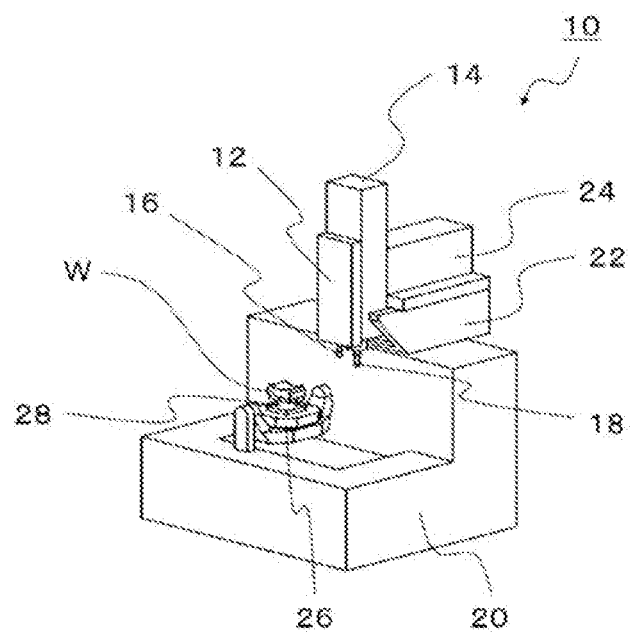
FIG. 2 is a perspective view of the composite processing machine according to the first embodiment of the present invention, schematically illustrating inside of the machine except a cover.

FIG. 1 is an external view of the composite processing machine 10 according to the first embodiment of the present invention and FIG. 2 is a schematic view of the composite processing machine 10 illustrating inside of the machine except a cover. As shown in FIG. 1 and FIG. 2, the composite processing machine 10 according to the first embodiment includes an additive manufacturing unit 12 (a light irradiator) that irradiates a workpiece W with energy to perform additive manufacturing in a processing area, a machining unit 14 (a cutting machine) that performs machining on the workpiece W in the processing area, a cover unit 30 covering the processing area and a shading filter 50 (a light blocking filter) disposed on a front face of the cover unit 30. Here, the processing area refers to an area in which the composite processing machine 10 performs additive manufacturing or machining on the workpiece W.

The cover unit 30 includes a door unit 40, a front cover 32 disposed on the front face of the composite processing machine 10, a side cover 34 disposed on a part of the front face, on a side face, and on a back face of the composite processing machine 10, and a top cover 36 that covers a top of the processing area. The door unit 40 is disposed on the front face of the composite processing machine 10 openably and closably. Opening the door unit 40 allows an operator, for example, to mount and remove a machining tool 18 on and from the machining unit 14, and to load and unload the workpiece W onto and from the processing area.

Furthermore, when the door unit 40 is closed, the operator watches inside including the processing area of the composite processing machine 10 through the shading filter 50. A control panel 90 is disposed adjacent to the shading filter 50. The operator operates the composite processing machine 10 and creates a processing program via the control panel 90. The control panel 90 includes means for controlling operations of the composite processing machine 10, means for inputting processing conditions etc. processing operations executed by the control means for the operator, and means for displaying processing conditions and values detected by various sensors, etc. to the operator.

The composite processing machine 10 includes a base 20, a saddle 22 disposed on the base 20 to be movable in a right and left direction, a column 24 disposed on the saddle 22 to be movable in a back and forth direction, the machining unit 14 disposed on the column 24 to be movable in an up and down direction, and the additive manufacturing unit 12 secured on the machining unit 14. That is, the machining unit 14 and the additive manufacturing unit 12 are disposed to be movable in the three directions based on the base 20. The machining unit 14 is configured to clamp a machining tool 18 and to rotate the clamped machining tool 18. The additive manufacturing unit 12 is configured to supply additive material and energy ray when additive manufacturing is performed on the workpiece W with a torch 16. Moreover, the composite processing machine 10 may include an automatic tool changing system (not shown in the figures) that changes the machining tool 18 clamped in the machining unit 14 automatically.

The composite processing machine 10 includes a workpiece table 26 secured to the base 20 rotatably around a horizontal axis directed in back and forth and around an axis perpendicular to the horizontal axis. Securing a clamping device 28 to the workpiece table 26 allows the workpiece W clamped in the clamping device 28 to be rotatable around the two axes based on the base 20.

Figure 3A:
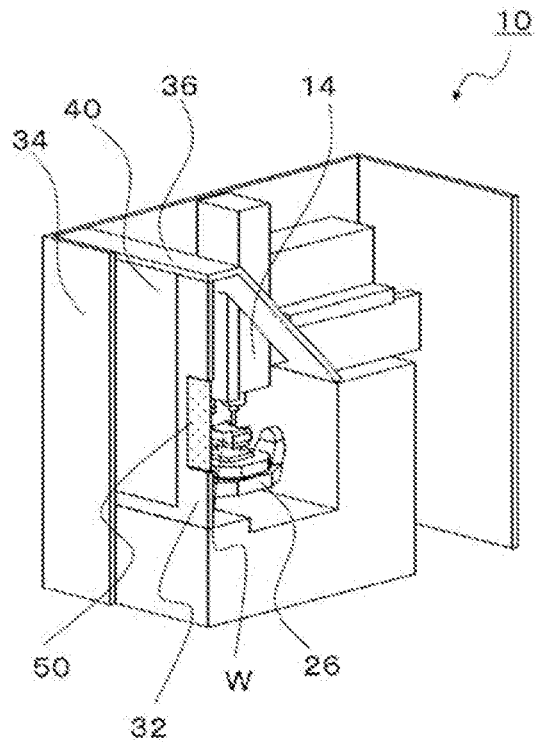
FIG. 3A is a perspective cross-sectional view of the composite processing machine according to the first embodiment of the present invention, illustrating that the machine is performing machining.
Figure 3B:
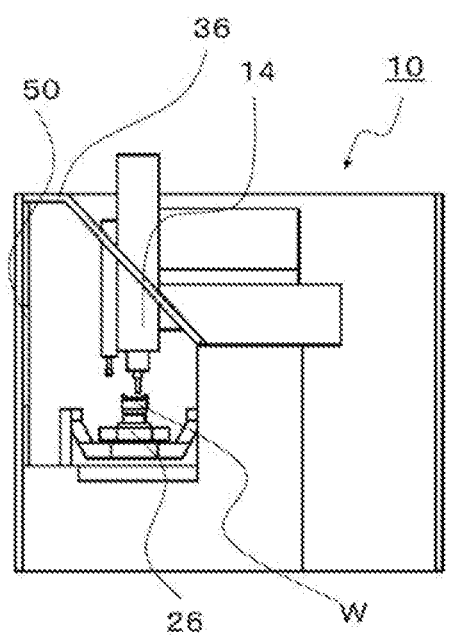
FIG. 3B is a cross-sectional view of the composite processing machine according to the first embodiment of the present invention, illustrating that the machine is performing machining.
Figure 3C:
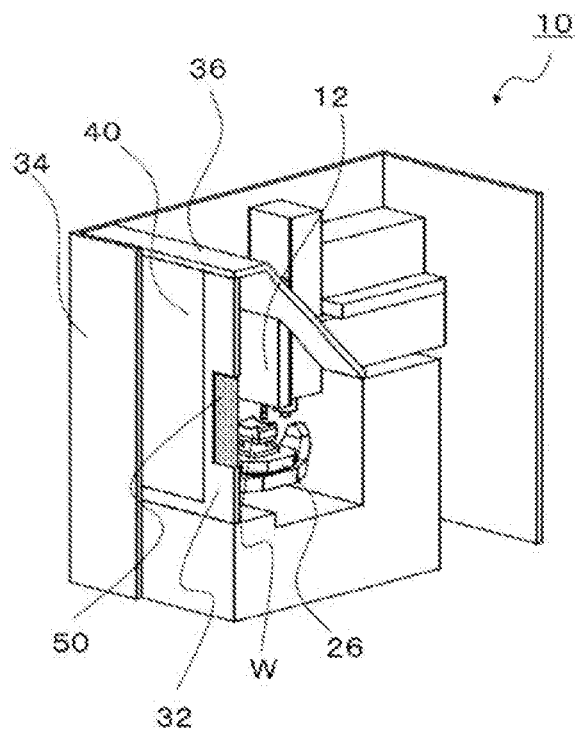
FIG. 3C is a perspective cross-sectional view of the composite processing machine according to the first embodiment of the present invention, illustrating that the machine is performing additive manufacturing.
Figure 3D:
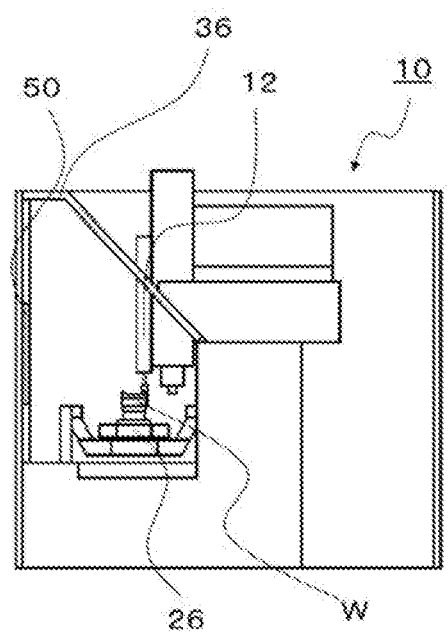
FIG. 3D is a cross-sectional view of the composite processing machine according to the first embodiment of the present invention, illustrating that the machine is performing additive manufacturing.

FIGS. 3A, 3B, 3C and 3D are cross-sectional views of the composite processing machine 10 according to the first embodiment of the present invention. FIGS. 3A and 3B illustrate that the machining unit 14 is performing machining, and FIGS. 3C and 3D illustrate that the additive manufacturing unit 12 is performing additive manufacturing.

The composite processing machine 10 according to the first embodiment performs the additive manufacturing or the machining on the workpiece W in the processing area after the door unit 40 has been closed. The processing area is covered with the front cover 32 on which the shading filter 50 is disposed, the side cover 34, the top cover 36, and the door unit 40. This prevents the glare radiated in the processing area from leaking out of the composite processing machine 10.

Here, the "additive manufacturing" refers to a technology in which supplying additive material such as wire or metal powder from the additive manufacturing unit on the workpiece and concentrating energy ray such as arc discharge or plasma to a point so as to control the point to be manufactured makes the additive material melted and combined selectively to the point on the workpiece. The "machining" includes "milling" and "turning", which are its typical examples. "Milling" is a machining in which a rotating milling tool attached on the machining unit is made to contact a workpiece secured in a clamping device that has been held and indexed. "Turning" is a machining in which a turning tool attached to the machining unit is made to contact a rotating workpiece.

Figure 4:
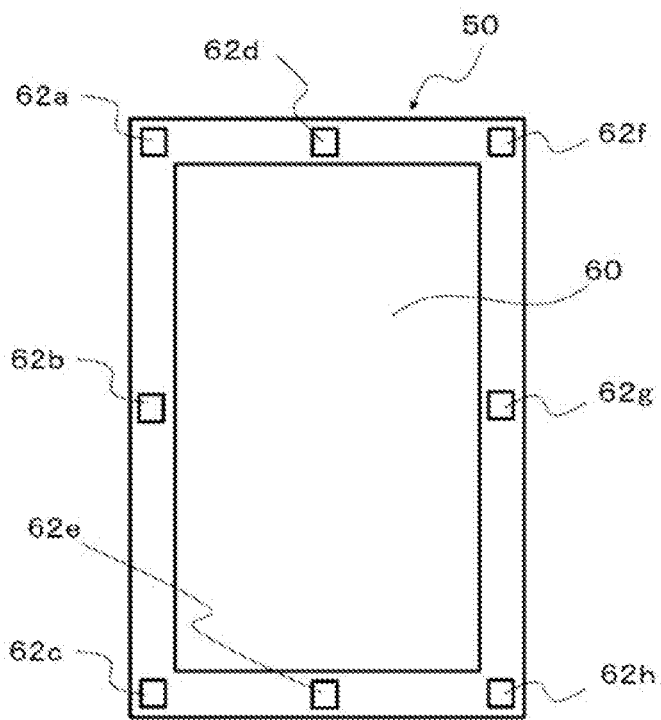
FIG. 4 is a schematic view of a shading filter according to the first embodiment of the present invention.

FIG. 4 is a schematic view of a shading filter 50 according to the first embodiment. The shading filter 50 includes a liquid crystal plate 60 and a plurality of photodetectors 62a to 62h and is disposed so as to receive light from the processing area. The shading filter 50 changes a degree of shade of the liquid crystal plate 60 in accordance with the light received by the photodetectors 62a to 62h disposed around the liquid crystal plate 60 and retains the degree of shade. In other words, the shading filter 50 is configured to change or maintain light transmissivity of the shading filter 50 in accordance with the light received by the photodetectors 62a to 62h disposed around the liquid crystal plate 60. The change and the retention of the degree of shade are controlled by external control signals. In addition, the shading filter 50 is supplied with current from a current supply unit such as an external power source or a battery (not shown in the figures). As shown in FIG. 1, a control circuit 5 is provided in the control panel 90 to change the degree of shade (light transmissivity) of the shading filter 50.

Specifications of the shading filter 50 will be described below. A degree of shade of the shading filter 50 is indicated as, what is called, a shade number. A shade number in a light state where additive manufacturing is not performed (that is, when the glare by arc discharge etc. is not detected) is #3. A shade number in a dark state where additive manufacturing is performed (that is, when the glare by arc discharge etc. is detected) is #11.

Here, the ISO4850 prescribes that luminous transmittance (visible light) in a case of the shade number #3 should be 13.9% at the standard. Luminous transmittance (visible light) in a case of the shade number #11 should be 0.0042% at the standard. In a case where the additive manufacturing unit 12 has different capability of irradiating with energy ray from the capability described above, the shading filter whose shade number is not #3 in the light state or not #11 in the dark state should be used. In addition, a shade number of the shading filter may be controlled to change gradually by more than two steps in accordance with strength of light received from the processing area.

FIGS. 3A and 3B illustrate that the composite processing machine 10 is performing machining. The shading filter 50 is in a light state while the machining unit 14 is performing machining on a workpiece W held on the workpiece table 26. In the light state, the operator can watch the whole processing area inside the composite processing machine 10 from outside of the shading filter 50. The shade number in this condition is #3 and the luminous transmittance (visible light) is nearly equal to 13.9%, which allows the operator to watch the whole processing area of the composite processing machine 10 although it looks a little darker inside of the machine. In addition, securing a lighting device (not shown in the figures) inside the composite processing machine 10 can improve the visibility.

FIGS. 3C and 3D illustrate that the composite processing machine 10 is performing additive manufacturing. When the additive manufacturing unit 12 performs additive manufacturing by welding with arc discharge on a workpiece W held on the workpiece table 26, the shading filter 50 changes the degree of shade and goes into a dark state and protects the operator from the glare. In the dark state, the operator can watch a part where the additive manufacturing is performed through the shading filter 50 from outside the composite processing machine 10 though the shading filter 50 is darkened. This enables the operator to change the additive manufacturing conditions and to find welding defects etc. earlier while watching the processing. The processing area other than the part of the additive manufacturing can hardly be watched.

Figure 5A:
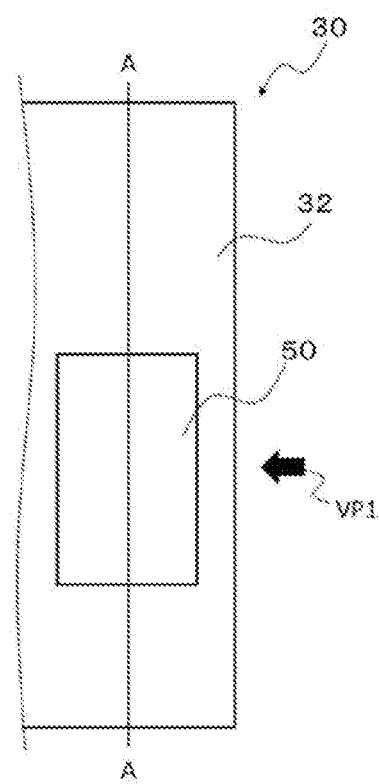
FIG. 5A is a schematic view of a front cover according to the first embodiment of the present invention.
Figure 5B:
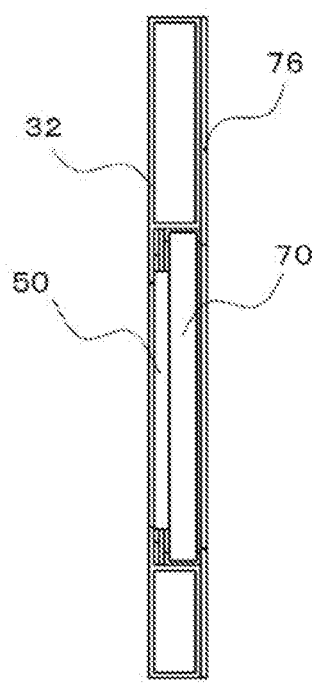
FIG. 5B is a schematic view of the front cover according to the first embodiment of the present invention, illustrating a cross-section of the front cover taken along a line A-A of FIG. 5A from the direction indicated by an arrow VP1.
Figure 5C:
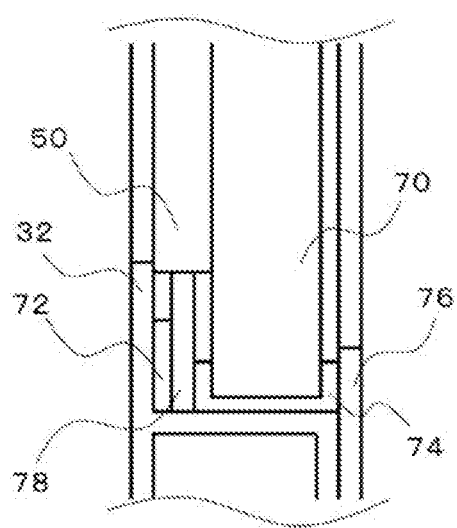
FIG. 5C is a schematic view of the front cover according to the first embodiment of the present invention, illustrating a configuration around a lower end of the shading filter of the front cover in FIG. 5B in a larger scale.

FIGS. 5A, 5B and 5C are schematic views of the front cover 32 according to the first embodiment. FIG. 5A is a front view of the front cover 32. FIG. 5B is a cross-sectional view taken along a line A-A in the FIG. 5A from the direction indicated by an arrow VP1. FIG. 5C is an enlarged view of a lower end of the shading filter 50 of the front cover 32 in FIG. 5B. The composite processing machine 10 includes a window glass 70, and the front cover 32 may include the window glass 70 that is put together with the shading filter 50 in layers. Actually, the front cover 32 includes a window glass 70, a shading filter 50 disposed outside (that is, on the operator side) of the composite processing machine 10, a sheet metal 78 to position the shading filter properly, a shading filter packing 72, a window glass packing 74, and a glass stopper 76 to push the window glass from inside the composite processing machine 10. As stated above, the window glass 70 disposed on the front cover 32 according to the first embodiment is inward (that is, on the processing area side) of the shading filter 50 of the composite processing machine 10. The glass stopper 76 is made of a non light-transmissive sheet metal and pushes an outer periphery portion of the window glass 70 from inside the composite processing machine 10 to secure the window glass 70 and the shading filter 50.

It is required that the composite processing machine 10 according to the first embodiment include the shading filter 50 on at least one face (for example, the front face) of the cover unit 30. The cover unit 30 should allow the operator to watch the processing area through the shading filter 50 from outside the composite processing machine 10. Furthermore, the window glass 70 that separates the shading filter 50 from the processing area may be disposed on the processing area side of the shading filter 50, and the operator watches the processing area through the shading filter 50 and the window glass 70 from outside the composite processing machine 10. It is noted that the degree of shade in the light state of the shading filter 50 may be same as or higher than the degree of shade of the window glass 70. In addition, in a case where the shading filter 50 is close to the processing area, it is desirable that a laminated glass with layers of hard strengthened glass etc. that are glued each other with a resin film etc. be used. This laminated glass is widely used in a machining-type machine tool. The laminated glass has an excellent resistance to impact of chips and coolant scattered during machining In case of breakage of the glass etc., the laminated glass prevents pieces of the broken glass etc. from scattering and works as a protective plate to protect the shading filter 50. As stated above, as long as the window glass 70 has functions to separate and protect the shading filter 50 from the processing area and to allow the operator to watch the processing area from outside the composite processing machine 10, the window glass 70 is not necessarily made of a laminated glass but may be made of a glass board or a resin plate etc. that are widely used. In this way, the configuration of the window glass 70, the glass stopper 76, and the window glass packing 74 prevents chips and coolant etc. from hitting on a shading filter 50.

Operation and Effect

According to the composite processing machine 10 of the first embodiment, the shading filter 50 changes a degree of shade in accordance with light received from the processing area. Therefore, in a case where no glare such as arc beam is emitted, for example when the additive manufacturing unit 12 or the machining unit 14 travels rapidly or when machining of the workpiece W is performed, the operator can easily watch and confirm condition of the whole area including the processing area of the composite processing machine 10. Meanwhile, when additive manufacturing is performed, the shading filter 50 changes the degree of shade and goes into a dark state. This enables the operator to change the processing conditions while confirming a state in which the additive manufacturing by welding with arc beam etc. is being performed on a workpiece W and to find welding defects etc. earlier. That is, the composite processing machine 10 according to the first embodiment protects the operator from light radiated during additive manufacturing and enables the operator to watch a processing area easily during machining.

Furthermore, employing a laminated glass as a window glass 70 prevents scattering things such as chips or coolant from leaking out of the processing area through the shading filter 50, which provides a space for the operator to watch the processing area during additive manufacturing or machining.

In a case where the operator wears a helmet or goggles that incorporates a shading filter 50, the operator needs an extra motion to put off the helmet or the goggle when the operator watches the processing area during machining where no glare is radiated, sees a display on the control panel 90, or works outside the composite processing machine 10. According to the composite processing machine 10 of the first embodiment, disposing a shading filter 50 on the cover unit 30 allows the operator to see the processing area through the darkened shading filter 50 only when the glare is radiated, which eliminates a step to put on and off the helmet etc. and enables the operator to watch the processing area and the outside of the composite processing machine 10 easily.

Second Embodiment

A composite processing machine 110 according to a second embodiment of the present invention will be described with FIGS. 6A and 6B. In the first embodiment, the shading filter 50 is disposed on the front cover 32 secured on the composite processing machine 10. Meanwhile, the second embodiment has a different point that each of a door unit 140 that is openable and closable includes a shading filter 150.

The machine configuration necessary for performing additive manufacturing and machining is same as the configuration of the first embodiment as shown in FIG. 2, therefore, here, the description of the machine configuration will be omitted.

Figure 6A:
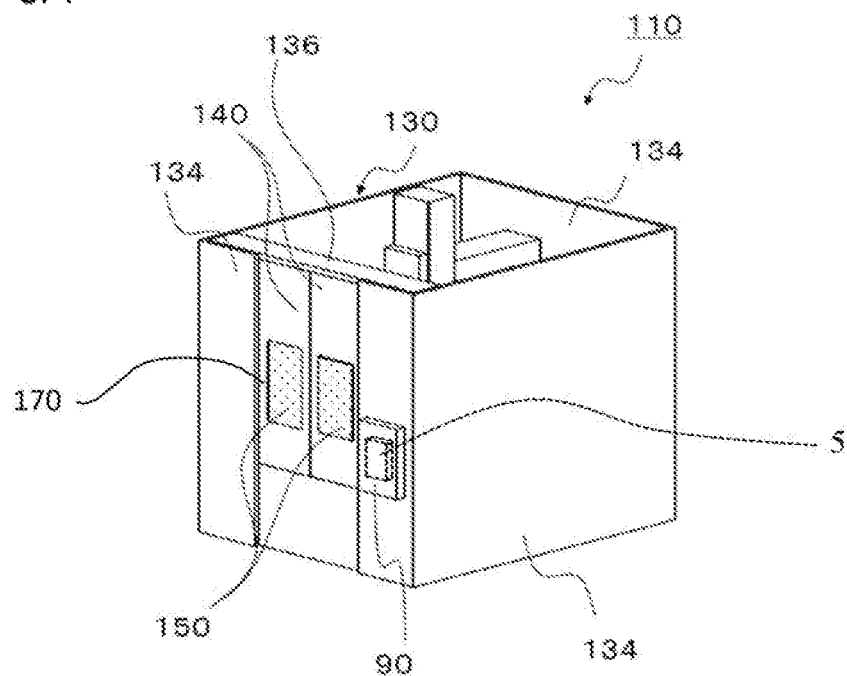
FIG. 6A is a perspective view of a composite processing machine according to a second embodiment of the present invention, illustrating an appearance of the whole composite processing machine.
Figure 6B:
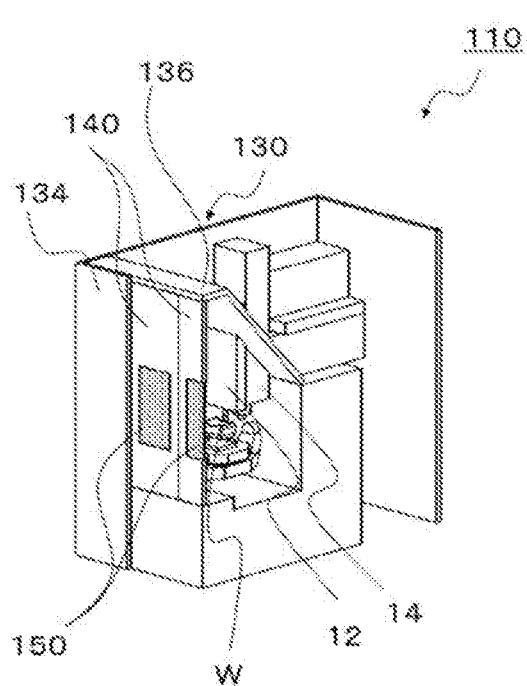
FIG. 6B is a perspective view of the composite processing machine according to the second embodiment of the present invention, illustrating a cross-section of the machine performing additive manufacturing.

FIGS. 6A and 6B are schematic views of the composite processing machine 110 according to the second embodiment of the present invention. FIG. 6A is an external view of the composite processing machine 110 with the door unit 140 closed and FIG. 6B is a perspective cross-sectional view of the machine.

As shown in FIGS. 6A and 6B, the composite processing machine 110 according to the second embodiment of the present invention includes the additive manufacturing unit 12 that irradiates a workpiece W with energy to perform additive manufacturing in a processing area, the machining unit 14 that performs machining on a workpiece W in the processing area, a cover unit 130 that covers the processing area. The cover unit 130 includes the door unit 140. The door unit 140 can be opened and closed on the front face and the shading filter 150 is disposed on each of the door unit 140.

The cover unit 130 includes the door unit 140, a side cover 134 disposed on a part of the front face, on side faces and on a back face of the composite processing machine 110, and a top cover 136 that covers a top of the processing area. The door unit 140 is openable and closable on the front face of the composite processing machine 110 and opening the door unit 140 allows the operator to do, for example, maintenance of the additive manufacturing unit 12 and the machining unit 14, and loading and unloading of the workpiece W.

Moreover, when the door unit 140 is closed, the operator watches inside including the processing area of the composite processing machine 110 through the shading filter 150 disposed on the door unit 140. The control panel 90 is disposed adjacent to the shading filter 150. The operator operates the composite processing machine 110 and creates a processing program via the control panel 90.

When the door unit 140 of the composite processing machine 110 according to the second embodiment is closed, the processing area in which additive manufacturing or machining is performed on a workpiece W is covered with the side cover 134, the top cover 136 and the door unit 140 that includes the shading filter 150. This prevents the glare radiated from the processing area from leaking out of the composite processing machine 110.

Specifications of the shading filter 150 of this embodiment should be same as the specifications of the shading filter 50 of the first embodiment.

Furthermore, the door unit 140 of the composite processing machine 110 may include the shading filter 150 and a window glass 170 that are put together in layers. Configuration of the shading filter 150 and the window glass 170 that are disposed on the door unit 140 is same as the configuration of the shading filter 50 and the window glass 70 disposed on the front cover 32 described in the first embodiment shown in the cross-sectional view taken along a line A-A in FIG. 5B, therefore, the description will be omitted, here.

It is required that the composite processing machine 110 of the second embodiment include the door unit 140 that is openable and closable on at least one face (front face, for example) of the cover unit 130. The door unit 140 should include a shading filter 150 to allow the operator to watch the processing area from outside the composite processing machine 110 through the shading filter 150. The door unit 140 may be a double door or a single door. Furthermore, the window glass 170 that separates the shading filter 150 from the processing area may be disposed on the processing area side of the shading filter 150 to allow the operator to watch the processing area from outside the composite processing machine 110 through the shading filter 150 and the window glass 170. It is noted that a degree of shade of the shading filter 150 in the light state may be same as or higher than a degree of shade of the window glass 170. In addition, in a case where the shading filter 150 is close to the processing area, it is desirable that a laminated glass with layers of hard strengthened glass, etc. that are glued each other with a resin film etc. be used. The laminated glass works as a protective plate for protecting the shading filter 150. As stated above, as long as the window glass 170 has functions to separate and protect the shading filter 150 from the processing area and to allow the operator to watch the processing area from outside the machine, the window glass 170 is not necessarily made of a laminated glass but may be made of a glass board or a resin plate etc. that is widely used.

As shown in FIG. 6A, while additive manufacturing is not being performed inside the composite processing machine 110, the shading filter 150 receives no glare radiated from the processing area and is in a light state. Meanwhile, as shown in FIG. 6B, while the additive manufacturing unit 12 is performing additive manufacturing by welding with arc discharge in the processing area inside the composite processing machine 110, the shading filter 150 is in a dark state due to the glare radiated from the processing area.

Operation and Effect

According to the composite processing machine 110 of the second embodiment, the shading filter 150 is disposed on the door unit 140. This enables the operator to watch the inside including the processing area of the composite processing machine 110 through the shading filter 150 during processing, and after the processing enables the operator to open the door unit 140 to check the workpiece W etc. from a same eye position as an eye position at watching during the processing.

Third Embodiment

A composite processing machine 210 according to a third embodiment of the present invention will be described with FIGS. 7A, 7B, 8, 9A and 9B. In the second embodiment, each of the double door unit 140 includes the shading filter 150. Meanwhile, the third embodiment has a different point that each of a door unit 240 being a double door includes a plurality of shading filters 250.

The machine configuration necessary for additive manufacturing and machining is same as the configuration of the first embodiment as shown in FIG. 2, therefore, here, the description of the machine configuration will be omitted.

Figure 7A:
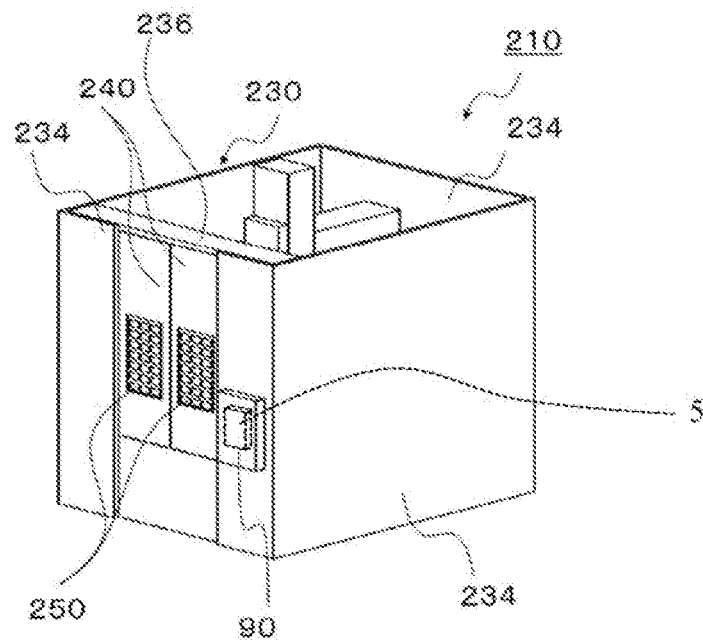
FIG. 7A is a perspective view of a composite processing machine according to a third embodiment of the present invention, illustrating an appearance of the whole composite processing machine.
Figure 7B:
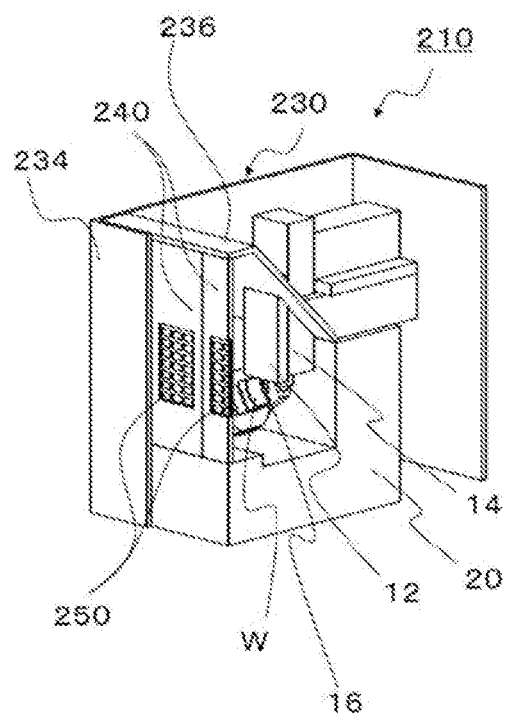
FIG. 7B is a perspective cross-sectional view of the composite processing machine according to the third embodiment of the present invention, illustrating that the machine is performing additive manufacturing.

FIGS. 7A and 7B are schematic views of the composite processing machine 210 according to the third embodiment of the present invention. FIG. 7A is an external view of the composite processing machine 210 with the door unit 240 closed, and FIG. 7B is a perspective cross-sectional view of the machine.

As shown in FIGS. 7A and 7B, the composite processing machine 210 according to the third embodiment of the present invention includes the additive manufacturing unit 12 that irradiates a workpiece W with energy to perform additive manufacturing in a processing area, the machining unit 14 that performs machining on a workpiece W in the processing area, and a cover unit 230 that covers the processing area. The cover unit 230 includes the door unit 240 that is openable and closable on a front face and that includes the plurality of shading filters 250 disposed in rows on the front. Each of the shading filters 250 includes a photodetector 262 stated below.

The cover unit 230 includes the door unit 240, a side cover 234 disposed on a part of the front face, on side faces, and on a back face of the composite processing machine 210, and a top cover 236 that covers a top of the processing area. The door unit 240 is disposed openably and closably on the front face of the composite processing machine 210. Opening the door unit 240 allows the operator to do, for example, maintenance of the additive manufacturing unit 12 and the machining unit 14, and loading and unloading of the workpiece W.

Moreover, in a state in which the door unit 240 is closed, the operator watches inside, including the processing area of the composite processing machine 210, through the plurality of shading filters 250 disposed in rows on the door unit 240. The control panel 90 is disposed adjacent to the shading filters 250. The operator operates the composite processing machine 210 and creates a processing program via the control panel 90.

Closing the door unit 240 of the composite processing machine 210 according to the third embodiment makes the processing area, where additive manufacturing or machining is performed on the workpiece W, covered with the side cover 234, the top cover 236, and the door unit 240 on which the plurality of shading filters 250 are disposed in rows and prevents the glare radiated from the processing area from leaking out of the composite processing machine 210.

Figure 8:
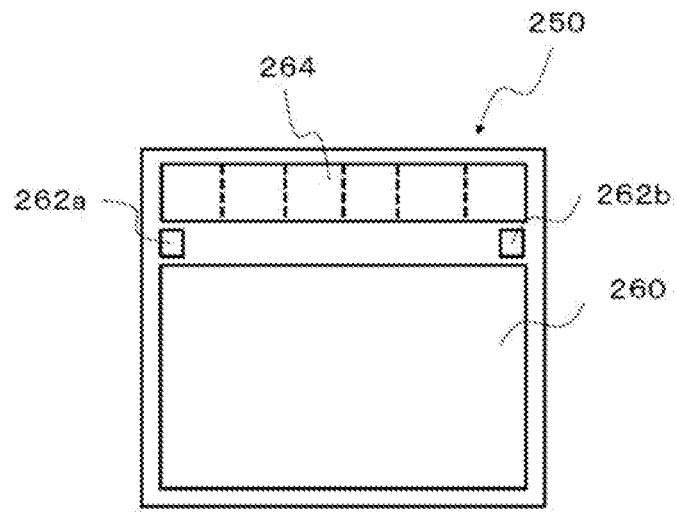
FIG. 8 is a schematic view of a shading filter according to the third embodiment of the present invention.

FIG. 8 is a schematic view of the shading filter 250 according to the third embodiment of the present invention. The shading filter 250 includes a liquid crystal plate 260, a plurality of photodetectors 262a, 262b, and a solar cell 264, and is disposed so as to receive light from the processing area side. The photodetectors 262a and 262b disposed on the right and on the left in an upper part of the liquid crystal plate 260 detect light radiated by arc discharge. In accordance with the detected light, a degree of shade of the liquid crystal plate 260 is changed and retained. The change and the retention are controlled by a controller (control circuit 5) in an electric substrate (not shown in the figures) mounted on the back of the solar cell 264.

The solar cell 264 receives light radiated by arc discharge, etc. The solar cell 264 generates and supplies power for changing and retaining a degree of shade to the above-stated controller mounted on the back of the solar cell 264. This makes wiring for power supply or providing signal lines for control unnecessary. This simplifies the configuration of the door unit 240, reduces production costs, and minimizes malfunctions. In addition, replacing the shading filter 250 or a window glass 270 stated below becomes easier.

Specifications of the shading filter 250 of the present embodiment should be same as the specifications of the shading filter 50 of the first embodiment.

Figure 9A:
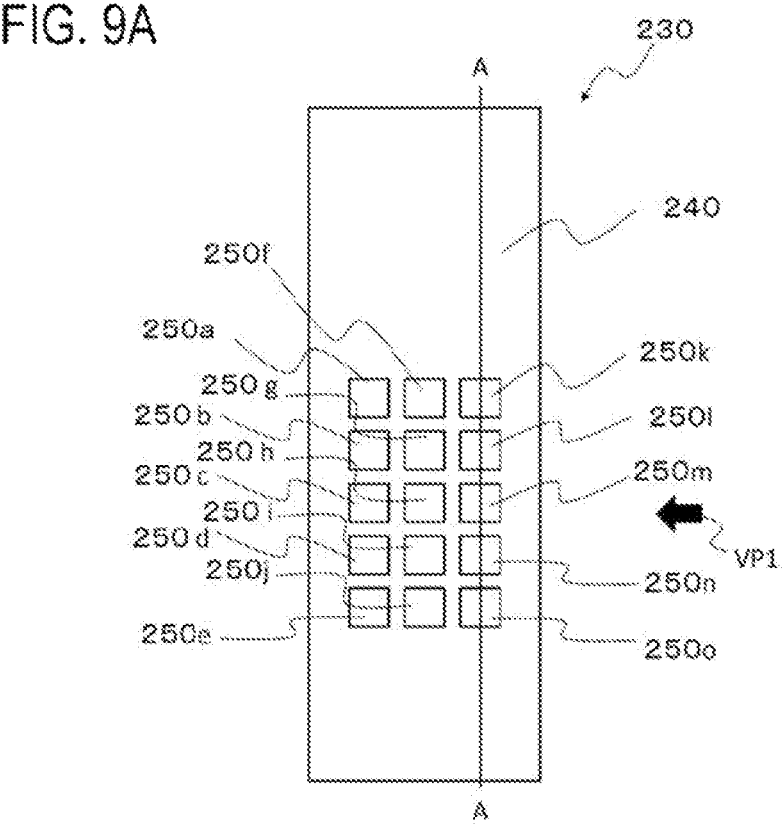
FIG. 9A is a schematic view of a door unit according to the third embodiment of the present invention.
Figure 9B:
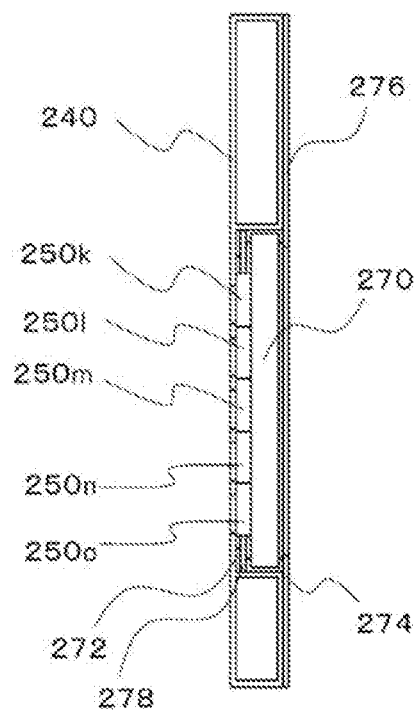
FIG. 9B is a schematic view of the door unit according to the third embodiment of the present invention, illustrating a cross-section of the door unit taken along a line A-A of FIG. 9A from a direction indicated by an arrow VP1.

FIGS. 9A and 9B are schematic views of the door unit 240 according to the third embodiment. FIG. 9A is a front view of the door unit 240 and FIG. 9B is a cross-sectional view taken along a line A-A in FIG. 9A from a direction indicated by an arrow VP1. The composite processing machine 210 may include a plurality of shading filters 250a to 250o in rows on at least one face (front face, for example) of the door unit 240, further, the window glass 270 may be put over the shading filters 250a to 250o. The door unit 240 includes the window glass 270, the shading filters 250a to 250o disposed outside (that is, on the operator side) of the composite processing machine 210, a sheet metal 278 to position the shading filters 250 properly, a shading filter packing 272, a window glass packing 274, and a glass stopper 276 to push the window glass 270 from inside the composite processing machine 210. As stated above, the window glass 270 disposed on the door unit 240 of the third embodiment is disposed inward (that is, on the processing area side) of the shading filters 250 of the composite processing machine 210. The glass stopper 276 is made of non light-transmissive sheet metal and pushes an outer periphery portion of the window glass 270 from inside the composite processing machine 210 to secure the window glass 270 and the shading filters 250.

It is required that the composite processing machine 210 of the third embodiment include the door unit 240 that is openable and closable on at least one face (the front face, for example) of the cover unit 230. The door unit 240 may be a double door or a single door. The door unit 240 should include a plurality of shading filters 250 disposed in rows to allow the operator to watch the processing area from outside the composite processing machine 210 through the shading filters 250. Furthermore, the window glass 270 that separates the shading filters 250 from the processing area may be disposed on the processing area side of the shading filters 250 to allow the operator to watch the processing area from outside the composite processing machine 210 through the shading filters 250 and the window glass 270. It is noted that the degree of shade of the shading filters 250 in the light state may be same as or higher than the degree of shade of the window glass 270. In addition, in a case where the shading filters 250 are close to the processing area, it is desirable that a laminated glass with layers of hard strengthened glass etc. that are glued each other with a resin film etc. be used. This laminated glass works as a protective plate for protecting the shading filters 250. As stated above, as long as the window glass 270 has functions to separate and protect the shading filters 250 from the processing area and to allow the operator to watch the processing area from outside the composite processing machine 210, the window glass 270 is not necessarily made of a laminated glass but may be made of a glass board or a resin plate etc. that are widely used.

FIG. 7B is a perspective cross-sectional view of the composite processing machine 10 with the door potion 240 closed. The composite processing machine 210 makes the workpiece W that is clamped rotatably around two axes based on the base 20 inclined. Then, making the additive manufacturing unit 12 of the composite processing machine 210 travel straight in three directions based on the base 20 makes a torch 16 attached on the additive manufacturing unit 12 move closer to the inclined workpiece W to perform additive manufacturing.

Figure 10:
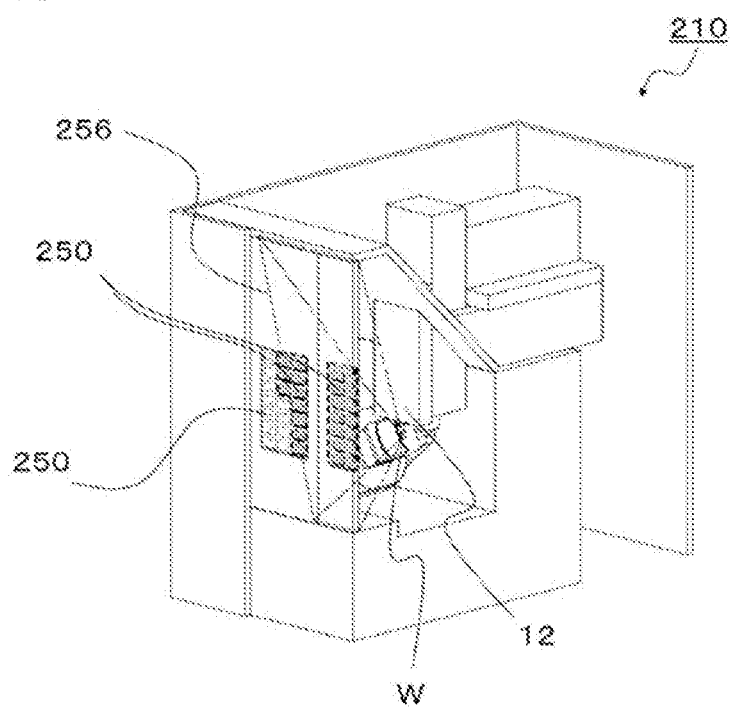
FIG. 10 is a perspective view and a cross-sectional view of the composite processing machine according to the third embodiment of the present invention, illustrating that the shading filters have changed during additive manufacturing.

FIG. 10 illustrates how the plurality of shading filters 250 have changed. It illustrates the change of the shading filters 250 in a case where additive manufacturing is performed on the inclined workpiece W, as stated above. An area 256 enclosed with a two-dot chain line is an area that receives the glare by arc discharge from the additive manufacturing unit 12. The shading filters 250 within the area 256 go into a dark state, however, the shading filters 250 outside the area 256 keep a light state.

Operation and Effect

In this way, according to the third embodiment, in accordance with the light detected with the photodetector 262 of the shading filter 250 within an area that receives the glare by arc discharge, a degree of shade of the liquid crystal plate 260 is changed to high and retained.

Furthermore, because only a part radiating glare is shaded, a degree of shade of the rest part of the workpiece W (that is, the part which the operator can watch safely) remains low. This allows the operator to watch inside of the composite processing machine 210. For example, the operator is able to confirm a status of a part of the workpiece W on which additive manufacturing has been finished or a part on which additive manufacturing or machining is to be performed, which enables the operator to change machining conditions or find welding defects earlier.

It is noted that the present embodiment may be applicable even in a case where the workpiece W is not made inclined, for example, when additive manufacturing is performed inside a cylindrical workpiece W, if an area that is radiating glare changes depending on a shape of the workpiece W.

Fourth Embodiment

A composite processing machine 310 according to a fourth embodiment of the present invention will be described with reference to FIG. 11. In the first embodiment, the shading filter 50 is disposed on a front face of the composite processing machine 10. Meanwhile, the fourth embodiment has a different point that the composite processing machine 310 further includes a shading filter 352 on a side face as well.

The machine configuration necessary for performing additive manufacturing and machining is same as the configuration of the first embodiment as shown in FIG. 2, therefore, here, the description of the machine configuration will be omitted.

Figure 11:
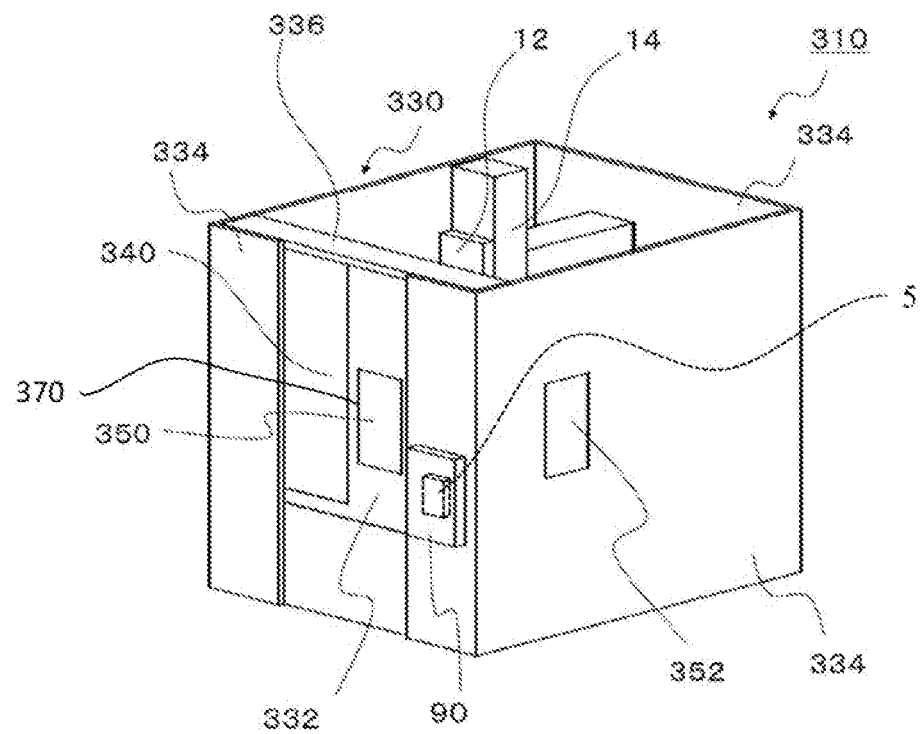
FIG. 11 is a perspective view of a composite processing machine according to a fourth embodiment of the present invention, illustrating an appearance of the whole composite processing machine.

FIG. 11 is a schematic view of the composite processing machine 310 according to the fourth embodiment of the present invention.

As shown in FIG. 11, the composite processing machine 310 according to the fourth embodiment of the present invention includes the additive manufacturing unit 12 that irradiates a workpiece W with energy to perform additive manufacturing in the processing area, the machining unit 14 that performs machining on a workpiece W in the processing area, a cover unit 330 that covers the processing area, a shading filter 350 disposed on a front face of the cover unit 330 and a shading filter 352 disposed on a side face of the cover unit 330.

The cover unit 330 includes a door unit 340, a front cover 332 disposed on a front face of the composite processing machine 310, a side cover 334 disposed on a part of the front face, on a side face, and on a back face of the composite processing machine 310, and a top cover 336 that covers a top of the processing area. The door unit 340 is disposed on the front face of the composite processing machine 310 openably and closably. Opening the door unit 340 allows the operator to do, for example, maintenance of the additive manufacturing unit 12 and the machining unit 14, and loading and unloading of the workpiece W.

Moreover, in a state in which the door unit 340 is closed, the operator watches inside including the processing area of the composite processing machine 310 through the shading filter 350 disposed on the front cover 332 or through the shading filter 352 disposed on a side face of the side cover 334, of the cover unit 330. The control panel 90 is disposed adjacent to the shading filter 350. The operator operates the composite processing machine 310 and creates a processing program via the control panel 90.

The processing area in which additive manufacturing or machining is performed on a workpiece W of the composite processing machine 310 according to the fourth embodiment is, in a state in which the door unit 340 is closed, covered with the front cover 332 that includes the shading filter 350, the side cover 334 that includes the shading filter 352, the top cover 336, and the door unit 340, which prevents the glare radiated from the processing area from leaking out of the composite processing machine 310.

Specifications of a shading filter 350 and 352 of the present embodiment should be same as the specifications of the shading filter 50 of the first embodiment.

Furthermore, each of the shading filters 350 and 352 of the cover unit 330 of the composite processing machine 310 may be put together with a window glass 370 in layers. The configurations of the window glass 370 and each of the shading filters 350 and 352 respectively disposed on the front cover 332 and the side cover 334 are same as the configuration of the shading filter 50 disposed on the front cover 32 and the window glass 70 as shown in the cross-sectional view taken along a line A-A in FIG. 5B, therefore, here, the description will be omitted.

It is required that more than one face of the cover unit 330 (for example, a front face and a side face) of the composite processing machine 310 according to the fourth embodiment have the shading filter 350 on each of the faces. The cover unit 330 should allow the operator to watch the processing area through the shading filter 350 or 352 from outside the composite processing machine 310. Furthermore, the window glass 370 may be disposed on the processing area side of the shading filter 350 to separate the shading filter 350 from the processing area, which allows the operator to watch the processing area through the shading filter 350 and the window glass 370 from outside the composite processing machine 310. It is noted that the degree of shade of the shading filter 350 in the light state may be same as or higher than the degree of shade of the window glass 370. In addition, in a case where the shading filter 350 is close to the processing area, it is desirable that a laminated glass with layers of hard strengthened glass etc. that are glued each other with a resin film etc. be used. This laminated glass works as a protective plate for protecting the shading filter 350. As stated above, as long as the window glass 370 has functions to separate and protect the shading filter 350 from the processing area and to allow the operator to watch the processing area from outside the machine, the window glass 370 is not necessarily made of a laminated glass but may be made of a glass board or a resin plate etc. that are widely used.

Operation and Effect

According to the composite processing machine 310 of the fourth embodiment, disposing a shading filter 350 on the front face and a shading filter 352 on the side face of the cover unit 330 enables the operator to watch inside of the composite processing machine from two directions as well as to protect the operator from the glare by arc discharge, etc. Only a part of the shading filter 350 that is radiating glare is shaded. This enables the operator to watch inside of the composite processing machine 310 from the direction that receives no glare. Furthermore, it enables the operator to confirm a status of a part of the workpiece W on which additive manufacturing has been finished or a part on which additive manufacturing or machining is to be performed so as to check whether interference will occur at a next path, to change processing conditions, and to find welding defects earlier.

Fifth Embodiments

A composite processing machine 410 according to fifth embodiments will be described with reference to FIGS. 12A, 12B, 12C, 12D, 13, 14A, 14B, 14C and 14D. In the second embodiment, the shading filter 150 and the window glass 170 are both disposed on the door unit 140. The fifth embodiment, however, has a different point that a shading filter 450 is disposed on a first door unit 440 and a window glass 470 is disposed on a second door unit 442 and the first door unit and the second door unit can be opened and closed independently.

It is noted that the machine configuration necessary for performing additive manufacturing and machining is same as the configuration of the first embodiment as shown in FIG. 1, therefore, the description will be omitted here.

FIGS. 12A, 12B, 12C and 12D are views of the composite processing machine 410 according to one of the fifth embodiments, illustrating a case in which the first door unit 440 disposed in right and left in a row is slid in a right and left direction to be opened and closed independently of the second door unit 442.

Figure 12A:
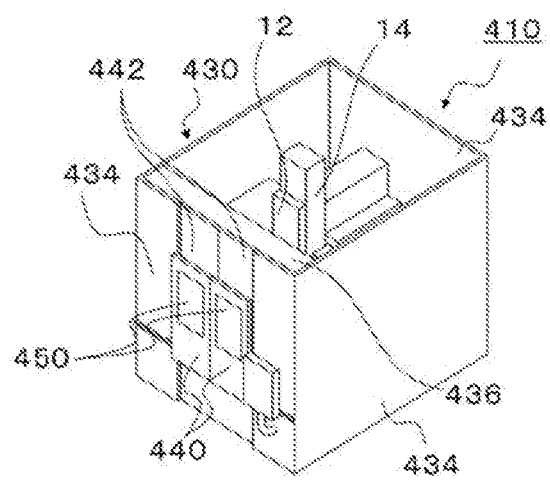
FIG. 12A is a perspective view of a composite processing machine according to one of fifth embodiments of the present invention, illustrating that a first door unit and a second door unit are closed.
Figure 12B:
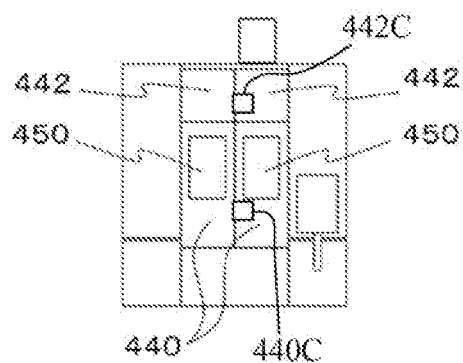
FIG. 12B is a front view of the composite processing machine according to the one of the fifth embodiments of the present invention, illustrating that the first door unit and the second door unit are closed.
Figure 12C:
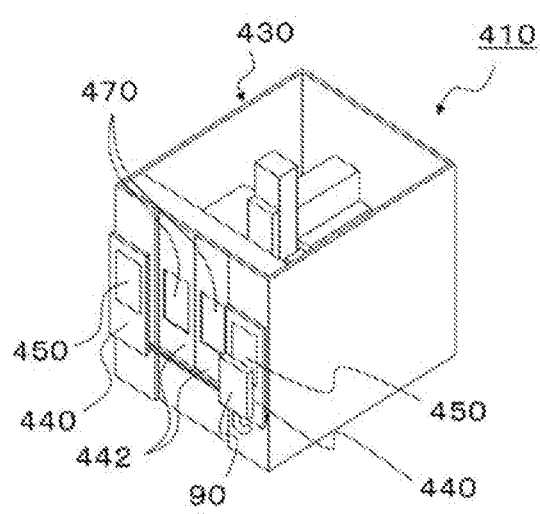
FIG. 12C is a perspective view of the composite processing machine according to the one of the fifth embodiments of the present invention, illustrating that the first door unit is open and the second door unit is closed.
Figure 12D:
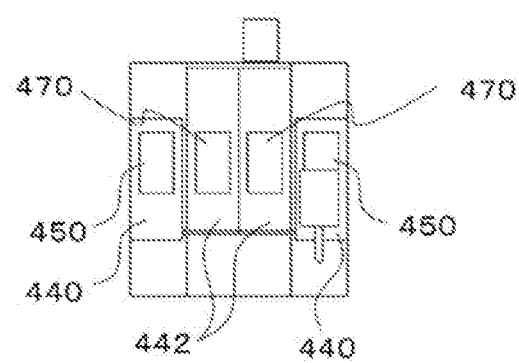
FIG. 12D is a front view of the composite processing machine according to the one of the fifth embodiments of the present invention, illustrating that the first door unit is open and the second door unit is closed.

FIGS. 12A and 12B illustrate that the first door unit 440 and the second door unit 442 are both closed. FIGS. 12C and 12D illustrate that the first door unit 440 is open and the second door unit 442 is closed. FIGS. 12A and 12C are views of the composite processing machine 410 from upper right, and FIGS. 12B and 12D are front views of the composite processing machine 410.

As shown in FIG. 12A, the composite processing machine 410 according to the fifth embodiment of the present invention includes the additive manufacturing unit 12 that irradiates a workpiece W with energy to perform additive manufacturing in the processing area, the machining unit 14 that performs machining on a workpiece W in the processing area, and a cover unit 430 that covers the processing area. The cover unit 430 includes the first door unit 440 and the second door unit 442 that are openable and closable on the front face of the cover unit 430. The second door unit 442 is disposed inward (that is, on the processing area side) of the first door unit 440 of the composite processing machine 410, and the first door unit 440 includes a shading filter 450 on the front face and the second door unit 442 includes a window glass 470 on the front face. In addition, the shading filter 450 and the window glass 470 are disposed so that they are overlapped in a state that the first door unit 440 and the second door unit 442 are both closed. In other words, the window glass 470 is disposed on the processing area side of the shading filter 450.

The cover unit 430 includes the first door unit 440, the second door unit 442, a side cover 434 disposed on a part of a front face, on a side face and on a back face of the composite processing machine 410, and a top cover 436 that covers a top of the processing area. The first door unit 440 and the second door unit 442 are disposed to be independently opened and closed on the front face of the composite processing machine 410. In a state that the first door unit 440 and the second door unit 442 are both open, the operator performs, for example, maintenance of the additive manufacturing unit 12 and the machining unit 14, and loading and unloading of the workpiece W.

As shown in FIGS. 12A and 12B, in a state where the first door unit 440 and the second door unit 442 are closed, the operator watches inside including the processing area of the composite processing machine 410 through the shading filter 450 and the window glass 470. Meanwhile, as shown in FIGS. 12C and 12D, when the first door unit 440 is open and the second door unit 442 is closed, the operator watches the inside including the processing area of the composite processing machine 410 through the window glass 470. The control panel 90 is disposed adjacent to the second door unit 442 and the operator operates the composite processing machine 10 and creates a processing program via the control panel 90.

When the first door unit 440 and the second door unit 442 of the composite processing machine 410 according to the fifth embodiment are both closed, the processing area in which additive manufacturing or machining is performed on the workpiece W is covered with the side cover 434, a top cover 436 and the first door unit 440 that includes the shading filter 450. This prevents the glare radiated from the processing area from leaking out of the composite processing machine 410.

Specifications of the shading filter 450 of the present embodiment should be same as the specifications of the shading filter 50 of the first embodiment.

Figure 13:
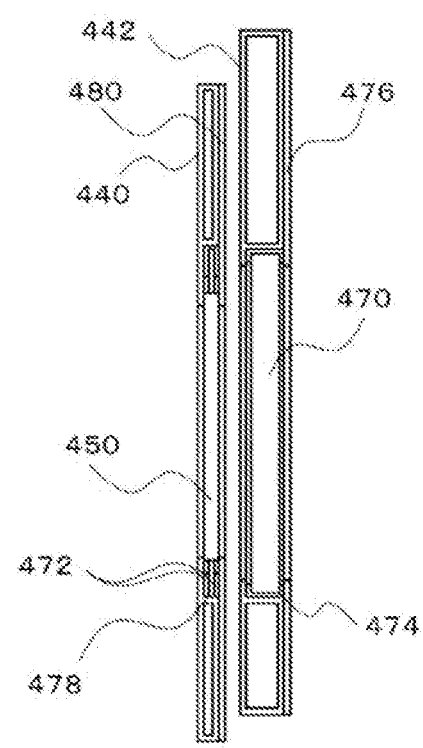
FIG. 13 is a cross-sectional view of the first door unit and the second door unit according to the fifth embodiments of the present invention, illustrating a configuration of the door units.

FIG. 13 is a schematic cross-sectional view of the first door unit 440 and the second door unit 442 according to the fifth embodiment. The first door unit 440 includes the shading filter 450 disposed outside (that is, on the operator side) of the composite processing machine 410, a sheet metal 478 to position the shading filter 450 properly, a shading filter packing 472 and a filter stopper 480 to push the shading filter 450 from the second door unit 442 side. The second door unit 442 includes the window glass 470 disposed outside (that is, on the operator side) of the composite processing machine 410, a window glass packing 474, and a glass stopper 476 to push the window glass 470 from inside of the composite processing machine 10. As stated above, the window glass 470 disposed on the second door unit 442 of the fifth embodiment is disposed inward (that is, on the processing area side) of the shading filter 450 disposed on the first door unit of the composite processing machine 410.

In addition, as is the case of the shading filter 250 of the third embodiment, the shading filter 450 disposed on the first door unit 440 may include a controller that changes and retains a degree of shade and a solar cell 264 that receives light radiated by the additive manufacturing to generate and supply power to the controller. Moreover, as is the case of the shading filter 250 of the third embodiment, it is possible to dispose a plurality of shading filters in rows on the first door unit 440.

It is required that the composite processing machine 410 according to the fifth embodiment include the first door unit 440 and the second door unit 442 that are disposed openably and closably on at least one face of the cover unit 430 (for example, a front face). The first door unit 440 and the second door unit 442 may be double doors or single doors. The first door unit 440 should include a shading filter 450 to allow the operator to watch the processing area through the shading filter 450 from outside the composite processing machine 410. Moreover, the second door unit 442 should include the window glass 470 disposed on the processing area side of the first door unit 440 to separate the shading filter 450 from the processing area, which enables the operator to watch the processing area through the shading filter 450 and the window glass 470 from outside the composite processing area 410. It is noted that a degree of shade of the shading filter 450 in the light state may be same as or higher than the degree of shade of the window glass 470. Furthermore, in a case where the window glass 470 is close to the processing area, it is desirable that a laminated glass with layers of hard strengthened glass etc. that are glued each other with a resin film etc. be used. This laminated glass works as a protective plate for protecting the shading filter 450. As stated above, as long as the window glass 470 has functions to separate and protect the shading filter 450 from the processing area and to allow the operator to watch the processing area from outside the composite processing machine 410, the window glass 470 is not necessarily made of a laminated glass but may be made of a glass board or a resin plate etc. that are widely used.

Furthermore, a first sensor 440C for detecting opening and closing the first door unit 440 (shown in FIG. 12B) and a second sensor 442C for detecting opening and closing the second door unit 442 (shown in FIG. 12B) are disposed on the cover unit 430, independently.

FIGS. 14A, 14B, 14C and 14D are schematic views of a composite processing machine 510 of an other of the fifth embodiments. This is an example where each of a first door unit 540 and a second door unit 542 is disposed in a right and left direction and is slid inside the composite processing machine 510 so as to be opened.

Figure 14A:
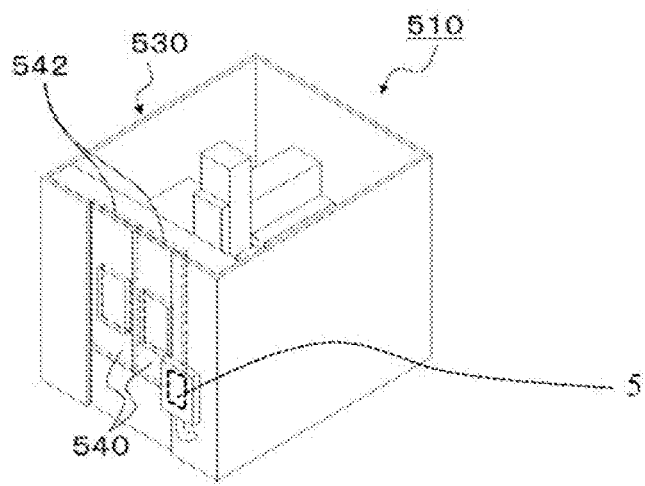
FIG. 14A is a perspective view of the composite processing machine according to an other of the fifth embodiments of the present invention, illustrating that a first door unit and a second door unit are closed.
Figure 14B:
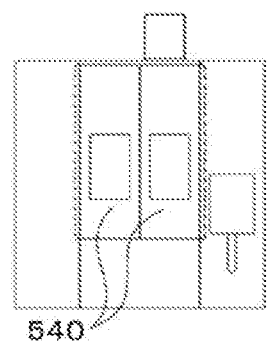
FIG. 14B is a front view of the composite processing machine according to the other of the fifth embodiments of the present invention, illustrating that the first door unit and the second door unit are closed.
Figure 14C:
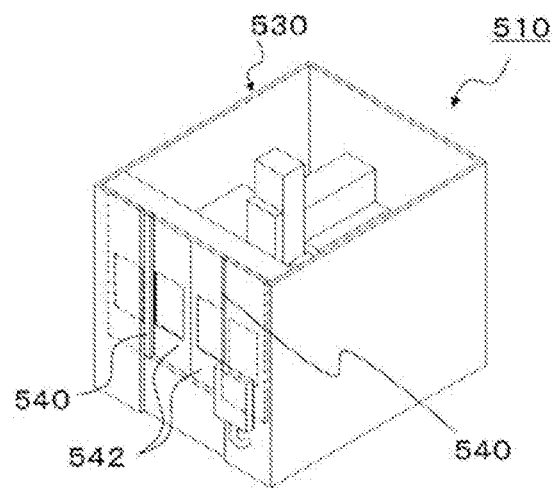
FIG. 14C is a perspective view of the composite processing machine according to the other of the fifth embodiments of the present invention, illustrating that the first door unit is open and the second door unit is closed.
Figure 14D:
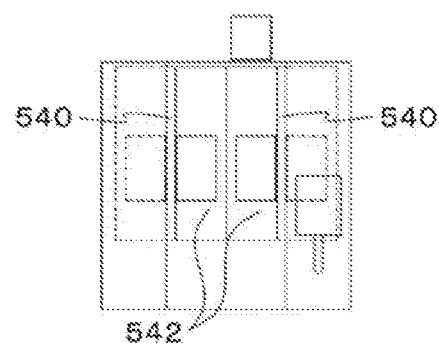
FIG. 14D is a front view of the composite processing machine according to the other of the fifth embodiments of the present invention, illustrating that the first door unit is open and the second door unit is closed.

FIGS. 14A and 14B illustrate that the first door unit 540 and the second door unit 542 are both closed. FIGS. 14C and 14D illustrate that the first door unit 540 is open and the second door unit 542 is closed. FIGS. 14A and 14C are views of the composite processing machine 510 from upper right, and FIGS. 14B and 14D are front views of the composite processing machine 510.

Each of the first door unit 540 and the second door unit 542 is slid to the left and right so as to be hidden behind the front face of the cover unit 530 of the composite processing machine 510.

Figure 15:
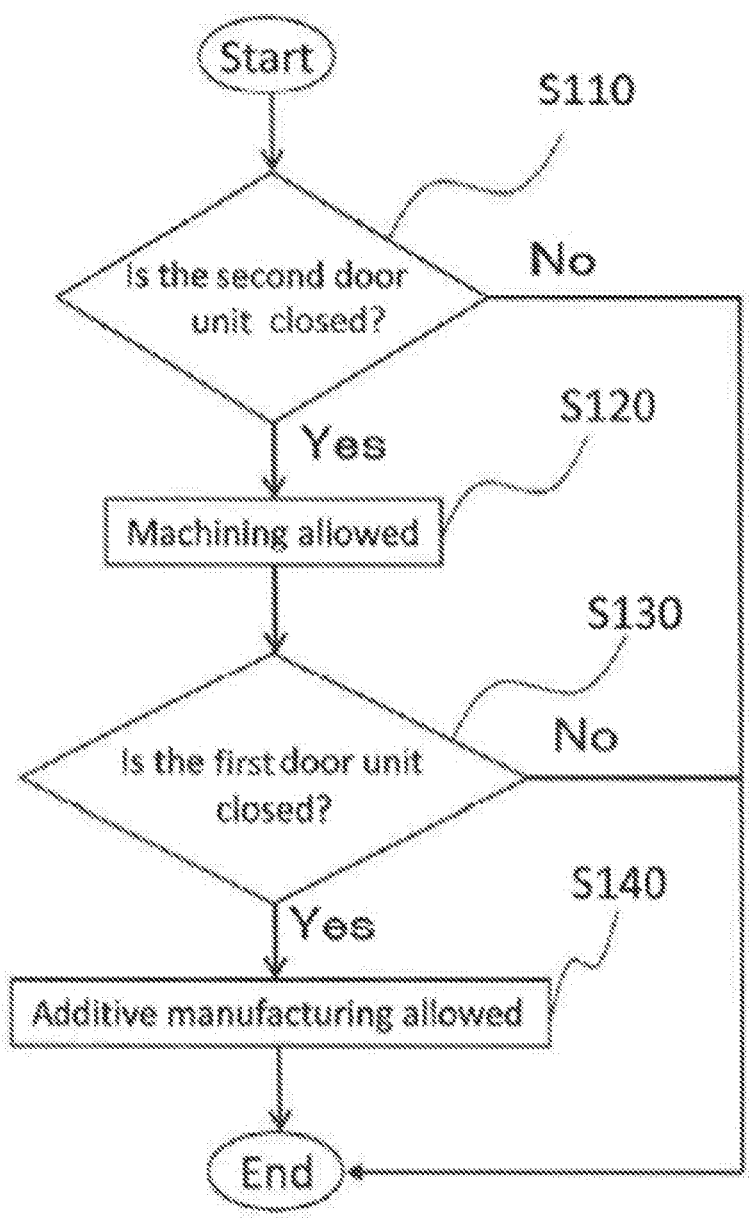
FIG. 15 is a flowchart of a composite processing method according to the fifth embodiments of the present invention performed by the composite processing machine.

FIG. 15 is a flowchart illustrating a composite processing method according to the fifth embodiments. As shown in FIG. 12, performing additive manufacturing with the composite processing machine 410 of the fifth embodiments requires that both of the first door unit 440 that includes the shading filter 450 and the second door unit 442 that includes a window glass 470 be closed. Meanwhile, when the composite processing machine 410 performs machining, the second door unit 442 that includes the window glass 470 needs to be closed but the first door unit 440 that includes the shading filter 450 may be open because there is no glare by arc discharge etc.

Here, the additive manufacturing is allowed to be performed only when the first door unit 440 and the second door unit 442 are both closed, that is, a safety control (what is called, interlock) is performed.

First, the above-mentioned second sensor detects that the second door unit 442 is closed (S110). When the second door unit 442 is closed (Yes in S110), a first control signal that machining can be executed is sent out to the machining unit 14 (S120). In this condition, the machining unit 14 can perform machining on a workpiece W.

Next, the above-mentioned first sensor detects that the first door unit 440 is closed (S130). When the first door unit 440 is closed (Yes in S130), a second control signal that additive manufacturing can be executed is sent out to the additive manufacturing unit 12 (S140). In this condition, the additive manufacturing unit 14 can perform additive manufacturing on the workpiece W.

Meanwhile, in a case where the first door unit 440 is not closed (No in S110) or where the second door unit 442 is not closed (No in S130), the procedure ends.

Here, it is noted that detecting opening and closing the first door unit 440 and the second door unit 442 and giving the above control signals may be achieved by a widely-used door sensor. These opening and closing signals from the first sensor and the second sensor are entered to the composite processing machine 410 so as to secure safety of the operator.

Operation and Effect

When there is no glare by arc discharge etc. for a certain period of time such as during machining, it is possible to watch the processing area inside the composite processing machine 410 through the window glass 470 that works as a protective plate, not through the shading filter 450 (that is, watching only through the laminated glass that is approximately transparent). In other words, it is possible to watch with a higher visibility (that is, the degree of shade is lower) than the visibility when watching through the shading filter 450.

Furthermore, according to the composite processing machine 410 of the fifth embodiments, it is possible to assemble the first door unit 440 and the second door unit 442, separately. The shading filter 450 can be replaced easily only by removing the first door unit 440, without removing the second door unit 442 that includes the window glass 470.

In addition, according to the composite processing method of the fifth embodiment, composite processing that includes additive manufacturing and machining can be performed in a state where the operator is protected from light radiated during additive manufacturing and, in addition, allowed to easily watch the processing area during machining.

It is noted that the present invention is not limited to the configurations of the above described embodiments, but includes a wide range of variations which fall under the scope of the present invention as defined by the appended claims.

For example, a case of mounting an additive manufacturing unit to a five-axis machining center of the above-described composite processing machine has been described, however, the additive manufacturing unit may be mounted on an other machining machine such as a vertical machining center, a horizontal machining center, and a turning center, as a machining system.

Moreover, the additive manufacturing unit and the machining unit of the above-described composite processing machine are driven by a same travelling system, but the composite processing machine may include different travelling systems that can cause the additive manufacturing unit and the machining unit to travel separately.

So far the present invention has been described in reference to preferable embodiments, however, the skilled person can obviously make various modifications in details, materials, and disposition of parts and configuration of the present invention whose properties are described in the specifications and in the drawings, within the scope of present invention as defined by the appended claims.

According to the embodiments, a composite processing machine includes an additive manufacturing unit, a machining unit, a cover unit and a shading filter. The additive manufacturing unit is configured to irradiate a workpiece with energy to perform additive manufacturing in a processing area. The machining unit is configured to machine the workpiece in the processing area. The cover unit is configured to cover the processing area. The shading filter is disposed on at least one face of the cover unit. The shading filter is configured to change a degree of shade according to light received from the processing area.

According to the embodiments, a composite processing method utilizes a composite processing machine that includes an additive manufacturing unit, a machining unit, a cover unit, a shading filter and a protective plate. The additive manufacturing unit is configured to irradiate a workpiece with energy to perform additive manufacturing in a processing area. The machining unit is configured to machine the workpiece in the processing area. The cover unit is configured to cover the processing area. The shading filter is configured to change a degree of shade according to light received from the processing area. The protective plate is configured to separate the shading filter from the processing area. The cover unit includes a first door unit, a second door unit, a first sensor, and a second sensor. The first door unit and the second door unit are disposed on at least one face of the cover unit openably and closably. The first sensor is configured to detect opening and closing of the first door unit. The second sensor is configured to detect opening and closing of the second door unit. The first door unit includes the shading filter on a part of the first door unit. The second door unit includes the protective plate on a part of the second door unit. With this composite processing machine, the composite processing method includes performing the additive manufacturing on the workpiece while a closed state of the first door unit and a closed state of the second door unit are both detected, and performing the machining on the workpiece while a closed state of the second door unit is detected.

The composite processing machine and the composite processing method according to the embodiments protect the operator from light radiated during additive manufacturing and enable the operator to easily watch the processing area during machining.

Obviously, numerous modifications and variations of the present invention are possible in light of the above teachings. It is therefore to be understood that within the scope of the appended claims, the invention may be practiced otherwise than as specifically described herein.

What is claimed is:

1. A composite processing machine comprising:
   a light irradiator to irradiate a workpiece with energy to perform additive manufacturing in a processing area;

a cutting machine to cut the workpiece in the processing area;

a cover covering the processing area;

a plurality of shading filters disposed in a plurality of rows on a face of the cover and configured to change a degree of shade in accordance with light received from the processing area; and a protective plate disposed on a processing area side of the plurality of shading filters, wherein the cover has a plurality of openings arranged in rows, each shading filter of the plurality of shading filters overlapping with a respective opening of the plurality of openings, wherein the plurality of shading filters are sandwiched between the cover and the protective plate, wherein each of the plurality of the shading filters comprises a plurality of photodetectors on a perimeter of each respective shading filter of the plurality of shading filters to receive light from the processing area, and wherein the plurality of shading filters further includes a control circuit configured to control changing and retaining the degree of shade of each respective shading filter of the plurality of shading filters in accordance with the light received from the processing area by respective photodetectors of the respective shading filter.

2. The composite processing machine according to claim 1, wherein each respective shading filter is configured to change the degree of shade between a light state where light radiated by the additive manufacturing is not received and a dark state where light radiated by the additive manufacturing is received, and wherein the degree of shade in the dark state is higher than the degree of shade in the light state.

3. The composite processing machine according to claim 2, wherein the degree of shade of the light state of each respective shading filter is same as or higher than a degree of shade of the protective plate.

4. The composite processing machine according to claim 1, wherein the cover comprises a door that is openable and closable on the face of the cover and that comprises the plurality of shading filters and the protective plate that are put together in layers.

5. The composite processing machine according to claim 4, wherein the plurality of shading filters comprises a solar cell to generate power when receiving light radiated by the additive manufacturing and to supply the power to the control circuit.

6. The composite processing machine according to claim 1, wherein the cover comprises a first door and a second door that are openable and closable on at least one face of the cover, wherein the first door comprises the plurality of shading filters on a part of the first door, wherein the second door comprises the protective plate on a part of the second door, and wherein the first door and the second door are disposed in such a way that the plurality of shading filters and the protective plate are overlapped when the first door and the second door are both closed.

7. The composite processing machine according to claim 6, wherein the composite processing machine further comprises a first sensor disposed on a part of the cover to detect opening and closing of the first door, and a second sensor disposed on a part of the cover to detect opening and closing of the second door.

8. The composite processing machine according to claim 6, wherein the plurality of shading filters comprises a solar cell to generate power when receiving light radiated by the additive manufacturing and to supply the power to the control circuit.

9. The composite processing machine according to claim 1, wherein the plurality of shading filters is disposed on a plurality of faces of the cover.

10. The composite processing machine according to claim 1, wherein the light irradiator is configured to perform the additive manufacturing using welding with arc discharge.

11. The composite processing machine according to claim 1, wherein the plurality of openings are further arranged in columns, and wherein the plurality of shading filters are disposed in the plurality of rows and a plurality of columns on the face of the cover.

12. A machining tool comprising:

a light irradiator to irradiate a workpiece to process the workpiece;

a cover covering the light irradiator and the workpiece in the cover;

a plurality of shading filters disposed in a plurality of rows and configured to change light transmissivity in accordance with light from an inside of the cover; and a protective plate disposed on a processing area side of the plurality of shading filters, wherein the cover has a plurality of openings arranged in rows, each shading filter of the plurality of shading filters overlapping with a respective opening of the plurality of openings, wherein the plurality of shading filters are sandwiched between the cover and the protective plate, wherein each of the plurality of the shading filters comprises a plurality of photodetectors on a perimeter of each respective shading filter of the plurality of shading filters to receive light from the processing area, and wherein the plurality of shading filters further includes a control circuit configured to control changing and retaining the degree of shade of each respective shading filter of the plurality of shading filters in accordance with the light received from the inside of the cover by respective photodetectors of the respective shading filter.

13. The machining tool according to claim 12, further comprising:

a cutting machine provided in the inside of the cover to cut the workpiece, wherein the light irradiator irradiates the workpiece to perform additive manufacturing on the workpiece.

14. The machining tool according to claim 12,
wherein the plurality of shading filters comprises:
- a solar cell to generate electric power based on the light from the inside of the cover and to supply the electric power to the control circuit.

15. The machining tool according to claim 12,
wherein the cover includes a first wall and a second wall, and
wherein the plurality of shading filters is provided on the first wall and the second wall.

16. The machining tool according to claim 12, wherein the plurality of shading filters is configured to change the light transmissivity of each respective shading filter in accordance with intensity of the light from the inside of the cover.

17. The machining tool according to claim 12, wherein the plurality of openings are further arranged in columns, and wherein the plurality of shading filters are disposed in the plurality of rows and a plurality of columns on a face of the cover.

\* \* \* \* \*